US010908252B2

(12) United States Patent
Grandin et al.

(10) Patent No.: US 10,908,252 B2
(45) Date of Patent: Feb. 2, 2021

(54) METHOD AND DEVICE FOR IDENTIFYING RADAR EMISSION MODES

(71) Applicant: THALES, Courbevoie (FR)

(72) Inventors: Jean-François Grandin, Elancourt (FR); Cyrille Enderli, Elancourt (FR); Jean-Marie Lemoine, Elancourt (FR)

(73) Assignee: THALES, Courbevoie (FR)

( * ) Notice: Subject to any disclaimer, the term of this patent is extended or adjusted under 35 U.S.C. 154(b) by 142 days.

(21) Appl. No.: 16/309,879

(22) PCT Filed: Jun. 2, 2017

(86) PCT No.: PCT/EP2017/063537
§ 371 (c)(1),
(2) Date: Dec. 13, 2018

(87) PCT Pub. No.: WO2018/019452
PCT Pub. Date: Feb. 1, 2018

(65) Prior Publication Data
US 2019/0162818 A1    May 30, 2019

(30) Foreign Application Priority Data

Jul. 26, 2016 (FR) ..................................... 16 01151

(51) Int. Cl.
*G01S 7/02* (2006.01)
*G01S 7/292* (2006.01)

(52) U.S. Cl.
CPC .............. *G01S 7/021* (2013.01); *G01S 7/292* (2013.01)

(58) Field of Classification Search
CPC ................................. G01S 7/021; G01S 7/292
(Continued)

(56) References Cited

U.S. PATENT DOCUMENTS 7,952,519 B1 * 5/2011 Nielsen ................ G01S 19/215
342/378
2006/0284755 A1 * 12/2006 Sirois ..................... G01S 7/021
342/13
(Continued)

FOREIGN PATENT DOCUMENTS

FR    2 754 603 A1    4/1998
FR    2 998 974 A1    6/2014
(Continued)

OTHER PUBLICATIONS

Grandin, "Information Fusion. Theory at Work", in Hassan Fourat (ed.): Multisensor Data Fusion—From Algorithms and Architectural Design to Applications, CRC-Press, 2015.
(Continued)

*Primary Examiner* — Vladimir Magloire
*Assistant Examiner* — Alexander L. Syrkin
(74) *Attorney, Agent, or Firm* — BakerHostetler

(57) ABSTRACT

A method and device for identifying radar emission modes are provided. A first step selects a small number of candidate modes arising from a database after the interception of an unknown radar mode characterized by parameters; a second step carries out a scoring operation: by assigning a similarity index to each of said parameters, for each candidate mode, the index being the index of similarity between the moment of the parameter of the candidate mode and the moment of the same parameter of the unknown mode; and by calculating a conflict value between the parameters taken pairwise on the basis of the similarity indices of each of the parameters; a third step consists in iteratively grouping together the parameters such that on each iteration: the two parameters having the lowest conflict value are grouped together; the similarity indices of the other parameters are calculated for the grouping; the conflicts are updated by calculating the conflict value between the grouping and the other param-
(Continued)

eters; the lowest conflict value is memorized along with the similarity indices of the two grouped parameters; the identification of the radar mode consisting in choosing the grouping of parameters arising from iteration, the lowest conflict value of which is lower than a threshold, and in retaining the candidate mode having the highest similarity index from among the similarity indices memorized up to iteration.

9 Claims, 8 Drawing Sheets

(58) Field of Classification Search
USPC .......................................................... 342/13
See application file for complete search history.

(56) References Cited

U.S. PATENT DOCUMENTS

2019/0195985 A1\* 6/2019 Lin ........................... G01S 7/40
2019/0257937 A1\* 8/2019 Tuttle ................... G01S 13/582

FOREIGN PATENT DOCUMENTS

FR         3 011 703 A1    4/2015
WO      2016/107905 A1    7/2016

OTHER PUBLICATIONS

Grandin, et al., "What Practical Differences Between Probabilities, Possibilities, and Credibilities", Proc. SPIE, vol. 4731, Sensor Fusion: Architectures, Algorithms, and Applications VI, 86, Mar. 2002.

Barritt, et al., "Enhancing electronic combat system digital signal processing using neural networks", Proceedings of the IEEE 1992 National Aerospace and Electronics Conference, vol. CONF. 44, pp. 887-893, May 18, 1992.

\* cited by examiner

METHOD AND DEVICE FOR IDENTIFYING RADAR EMISSION MODES

CROSS-REFERENCE TO RELATED APPLICATIONS

This application is a National Stage of International patent application PCT/EP2017/063537, filed on Jun. 2, 2017, which claims priority to foreign French patent application No. FR 16/01151, filed on Jul. 26, 2016, the disclosures of which are incorporated by reference in their entirety.

FIELD OF THE INVENTION

The present invention relates to a method for identifying modes of radar emissions intercepted by a device for detecting radar signals (radar detector), particularly in the case of imperfections in the measurements (incomplete measurements, uncertain measurements). It also relates to any device able to implement this method.

The invention lies in the field of radar signal detection, and relates more especially to the identification of the waveforms emitted by radars in the environment, in particular in the contexts of an alert (for self-protection for example), of tactical situation awareness or of intelligence.

BACKGROUND

In a system for detecting radar signals, the identification of the radar modes takes place downstream of the chain of the processings applied to the emissions which radiate on the antenna, or the antennas, of the sensor of the detection system. Identification suffers in particular from the limitations of the upstream processings; indeed the following drawbacks may be cited:
- the interception of each of the signals arriving at the receiver is often incomplete, or indeed very incomplete;
- the characterization of the signals by radioelectric parameters and also the characterization of the interception conditions are not always exhaustive;
- the construction of the tracks (sets of intercepted pulses) can be corrupted by outlier values.

Moreover, identification is based on comparing the characteristics of a track with the radar characteristics stored in a database built on the basis of materiel having suffered from the defects mentioned above.

SUMMARY OF THE INVENTION

An aim of the invention is in particular to overcome the aforementioned drawbacks. For this purpose, a subject of the invention is a method for identifying modes of radar emission by a system for detecting radar signals, a mode being characterized by a set of parameters, the said method comprising at least:
- a first step selecting a restricted number of candidate modes arising from a database on the basis of the interception of an unknown radar mode to be identified able to be characterized by a number L of given parameters;
- a second step performing a scoring:
  by assigning a similarity index to each of the said L parameters, for each candidate mode, the said index being the index of similarity between the moment of the parameter of the candidate mode and the moment of the same parameter of the unknown mode and;
  by computing a value of conflict between the said parameters taken pairwise, computation performed on the basis of the indices of similarity of moments of each of the said parameters;
- a third step consisting in grouping together, by successive iterations, the said L parameters in such a way that, at each iteration:
  the two parameters having the lowest conflict value ($K_{min}^{(t)}$) are grouped together;
  the similarity indices of the moments of the other parameters are computed for the grouping;
  the updating of the conflicts is performed by computing the value of conflict between the grouping and the other parameters;
  the lowest conflict value ($K_{min}^{(t)}$) is stored as well as the similarity indices ($i_1^{(t)}$ and $i_2^{(t)}$ of the two amalgamated parameters;
the identification of the radar mode consisting in choosing the grouping of parameters that arises from the iteration (t) whose value of lowest conflict ($K_{min}^{(t)}$) is less than a given threshold, and in retaining first the candidate mode whose similarity index is the largest from among the similarity indices stored up to the said iteration (t).

In a particular mode of implementation, the said method uses a database storing the radar modes in the forms of intervals delimited by the minimum and maximum values of each characteristic parameter, a candidate mode being selected in the said first step by comparing the measurements of parameters of the said unknown radar mode with the said intervals, a candidate mode being retained if it comprises at least one interval containing a measurement of a parameter of the unknown radar mode.

The parameters used to define the said intervals in the database are for example the emission frequency, the pulse length and the repetition period of the pulses.

The similarity indices being of the probabilistic type, the value of the conflict K between two parameters is for example given by the following equation:

$$K = 1 - \sum_B P_1(B)P_2(B)$$

$P_1(B)$, $P_2(B)$ being respectively the probability of one of the two parameters and the probability of the other parameter, in the mode B running through the set of candidate modes.

The similarity indices being of the possibilistic type, the value of the conflict K between two parameters is for example given by the following equation:

$$K = 1 - \sup_B \min(\pi_1(B), \pi_2(B))$$

$\pi_1(B)$, $\pi_2(B)$ being respectively the possibility of one of the two parameters and the possibility of the other parameter, in the mode B running through the set of candidate modes.

The similarity indices being of the credibilistic type, the value of the conflict K between two parameters is for example given by the following equation:

$$K = 1 - \sum_{B \cap C = \phi} m_1(B)m_2(C)$$

$m_1(B)$, $m_2(C)$ being respectively the credibility of one of the two parameters and the credibility of the other parameter, in the modes B and C running through the set of candidate modes.

The similarity index assigned to a parameter, for a candidate mode, is for example computed on the basis of a Jaccard index, this index being defined between the set of values of the said parameter for the said unknown radar mode and the set of values of the said parameter for the said candidate mode.

A subject of the invention is also a device for identifying radar emission modes comprising a system for receiving radar signals and processing means able to implement the method such as described previously.

A subject of the invention is also a radar implementing this method.

BRIEF DESCRIPTION OF THE DRAWINGS

Other characteristics and advantages of the invention will become apparent with the aid of the description which follows with regard to the appended drawings which represent.

Before describing the invention in greater detail, a technical problem and some inadequacies of the prior art are specified.

DETAILED DESCRIPTION

Figure 1:
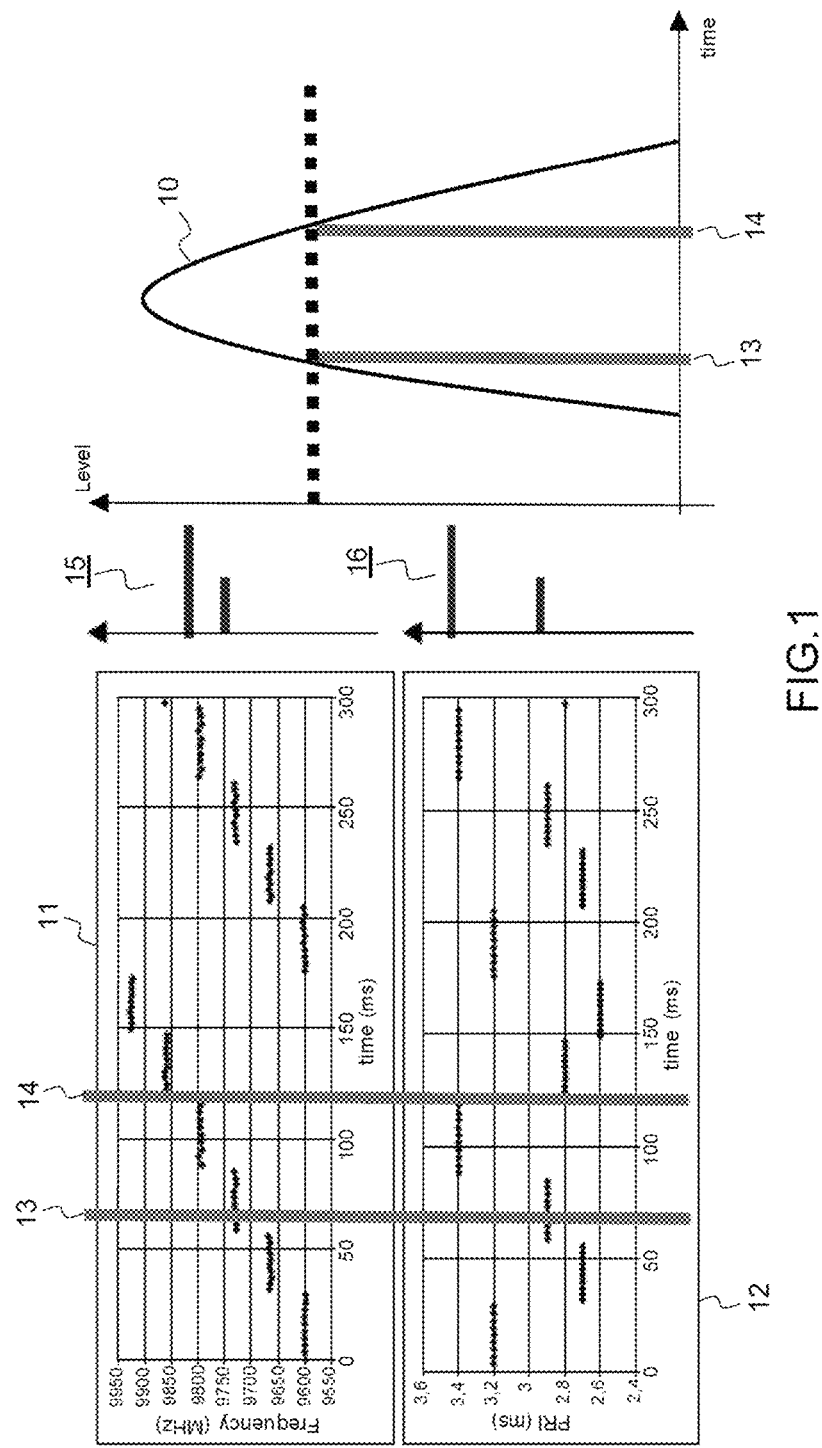
FIG. 1, an illustration of a partial interception.

FIG. 1 illustrates the partial interception of a mode of radar emission which is agile in terms of carrier frequency (ordinate) and of time intervals between pulses (abscissa). On the left of FIG. 1 the top graphic 11 represents by points the values of carrier frequency of each pulse transmitted by the radar and the bottom graphic 12 represents the time intervals between each pulse and the next, these intervals being called PRIs (Pulse Repetition Interval—PRI). This is a so-called "switching tiers" conventional radar mode. Curve 10 on the right represents the level of the signal arriving at the listening receiver, taking the shape of the lobe of the rotating antenna of the radar, as a function of time. The sensitivity of the receiver makes it possible to observe only the signal part situated in the time interval demarcated by the two vertical bars 13, 14. The histograms 15, 16, plotted vertically in the central part of the figure, of observed values for the frequency and the PRI, then comprise only two distinct spectral lines whilst in reality the radar mode comprises many more values. If moreover the switching tiers are not synchronous with the antenna scan, the values observed at the next transit of the radar lobe will be different. In an environment comprising numerous radars with relatively similar modes, the construction and identification of the tracks can then become imperfect.

These partial identifications, carried out on the basis of the radioelectric parameters describing the interception being taken individually, then exhibit uncertainties of an essentially non-stochastic nature: the interceptions carried out to compile a database and the new interceptions to be identified do not lend themselves naturally to modelling by probability laws, as would be the case if the measured parameters were corrupted by thermal noise alone.

In this context and from an operators point of view, the possibility of discerning the groups of mutually coherent parameters which lead towards one and the same identification would allow the non-stochastic uncertainties to be taken into account at a first level. These groups of parameters will be called amalgamations of parameters hereinafter.

Thus one technical problem that must be solved, in order to overcome the drawbacks cited in the introduction, is ultimately that of the revealing of such amalgamations in the context of the identification of radar modes.

Both in intelligence missions and tactical situation or self-protection (alert) missions, in order to control the electromagnetic spectrum and if relevant hinder the operation of the adverse systems, a major function of an electronic warfare system is the identification of the intercepted emissions [1]. These latter must first be extracted, that is to say that the mixture of the many signals received must be sorted to form "tracks" which characterize each emission [2,3]. The radar signals are in their very great majority more or less periodic pulse trains, so that emissions are in general characterized by parameters of the pulse, such as the carrier frequency or the pulse duration for example, as well as by inter-pulse parameters, such as the time interval between consecutive pulses PRI [1-4].

Modern radars have complex waveforms in which the radioelectric parameters can be variable on the scale of pulse trains or indeed on the scale of the pulses, the relative amplitude of the variations being able to range from less than 1% to very significant agilities. This is why significant efforts may be required for example for the implementation of "clustering" in order to group the pulses together into tracks and/or for other artificial intelligence techniques, with real-time constraints [4,5]. Among these techniques, schemes based on neural networks are often used. The "FUZZyARTMAP" classifier developed initially for other problems of artificial intelligence [6] is used widely in the ESM field (detection of radars for tactical purposes) and comprises numerous variants [7]. It has in particular been enriched with a "clustering" step which uses position information (mainly the direction of arrival of the signal and its amplitude, the latter being related to the distance) on the emitters in addition to radioelectric parameters, and which is applied successfully to streams of pulses generated by simulation [8] in comparison to other, non-parametric and semi-parametric, approaches. "FUZZyARTMAP" has also been applied to real data [9]. It exhibits the advantages of lending itself well to parallelization (for problem issues of real-time implementation), of being able to process heterogeneous (binary or analogue) information as well as incomplete data, and finally of being able to undergo on-line retraining. On the other hand, it comprises numerous parameters to be adjusted, and its network-like structure does not allow fine understanding of its manner of operation nor a fortiori the formation of amalgamations of parameters.

In order to combat the uncertainties in the measurements induced by the agility (stagger) or instability (jitter) of the radioelectric parameters, recognition approaches based on fuzzy logic are sometimes used because of the robustness that they offer. For example [10] uses a fuzzy inference engine to recognize radar pulses. More recently [11,12] propose an extension to type II fuzzy logic where the functions of membership in the fuzzy sets are themselves fuzzy quantities, thereby making it possible to take into account the uncertainties of the measurements at a higher level.

Numerous authors use more conventional approaches, which often offer good results but whose complexity generally increases rapidly with the number of radar pulses for the training of the classifiers and/or the recognition of the unknown tracks. The k nearest neighbours and radial basis functions are schemes cited in [7,8], or else in [13] for RWR (Radar Warning Receiver) specific application. An example of using vector support machines for the recognition of radar emissions is described in [14]. Sometimes combinations of schemes are found as in [15] where the combined use of rough Pawlak sets and RVMs (Relevance Vector Machines) makes it possible to decrease the computational load.

A particular case of the problem of the recognition of radar emissions is the identification of the specifics of the emitters (Specific Emitter Identification, SEI) where it is sought to recognize more precisely which individual apparatus (that is to say which copy of one and the same type of radar, with its serial number, its version etc.) is at the origin of the emissions intercepted by the listening system. Research into SEI is very active and provides beneficial approaches for exploiting non-intentional modulations on the radar pulses emitted [16,17] or for extracting discriminating characteristics based on diverse formalisms such as fractals [18,19], cumulants [20,21], stochastic differential geometry [22], or else analysis of the distributions of radio-electric parameters (in particular the PRI) [23]. On the basis of the discriminating characteristics extracted, one finds also in SEI the main standard recognition schemes—neuronal schemes in [18,19,21], K-means in [22], SVM in [20,24].

As reported in [11], the main difficulties originate from the uncertainty induced by the fluctuations, intentional or otherwise, of the measured parameters and the imperfect interceptions resulting therefrom. In practice, the sensors which provide measurements of various parameters include inaccuracies and uncertainties (related to the partial interceptions and to imperfections of construction of tracks, in particular) which are propagated in the fusion process, namely the identification of the radar modes [25]. In order to take into account the propagation of the uncertainties in a system comprising several sensors, there exist various data fusion techniques suited to the various natures of the uncertainties, the main ones being the Bayesian, possibilistic, and credibilistic (Dempster-Shafer) [25,26] techniques. Recently, [25] has performed a comparison of the Bayesian and Dempster-Shafer approaches and has revealed the superiority of the latter in the context of the identification of radar modes where the uncertainties are mainly of a non-stochastic nature. The contribution of the possibilistic approach [27] as compared with the probabilistic approach as well as the taking into account of a notion of conflict between information sources through "adaptive" fusion rules are discussed in [28,29] in particular. Its algebraic properties have been analysed in depth in [30] and generalized on the basis of T-conorm operators in [31]. However, no modality for analysing amalgamations of parameters is proposed in these various papers.

The limits of a Bayesian approach are now shown in a numerical example. Let us assume we have 4 parameters $P_1, \ldots P_4$ so as to identify a track from among 5 candidate modes $C_1, \ldots, C_5$. Typical parameters in electromagnetic listening are the carrier frequency, the length of the pulses, the time interval between them (PRI), etc. The probability masses associated with the candidate modes for each of the parameters are provided elsewhere and compiled in Table 1 hereinbelow, which presents an example of probabilities of 5 candidate modes for 4 parameters.

TABLE 1

|    | P1   | P2   | P3   | P4   |
|----|------|------|------|------|
| C1 | 0.69 | 0.01 | 0.09 | 0.73 |
| C2 | 0.08 | 0.08 | 0.08 | 0.08 |
| C3 | 0.08 | 0.08 | 0.08 | 0.08 |
| C4 | 0.08 | 0.74 | 0.67 | 0.03 |
| C5 | 0.08 | 0.08 | 0.08 | 0.08 |

To within rounding errors in display, the sum of the values in each column equals 1 since each parameter competes to identify one of the 5 candidate modes. At this level it is possible to take into account a rejection class where some of the parameters would not make it possible to assign an appreciable probability mass to any of the candidate modes. The probability masses generally being obtained on completion of a renormalization step so as to sum to 1, one way of taking a rejection class into account is to threshold at 0 the masses which are too low before renormalization.

From Table 1 it is possible to deduce probabilities for each candidate, conditional on the 4 joint values of the parameters according to the conventional Bayesian combination formula:

$$\pi(C_n/P_1 \ldots P_4) = \frac{\prod_{j=1}^{4} \pi(C_n/P_j)}{\sum_{i=1}^{5} \prod_{j=1}^{4} \pi(C_i/P_j)},$$

where $\pi(C_i/P_j)$ designates the probability of the mode $C_i$ for the value of the parameter $P_j$, i=1 to 5 and j=1 to 4 (i.e. the box of Table 1 in the i-th row and j-th column). The application of the above combination formula gives Table 2 below for the probabilities of the candidate modes, presenting a Bayesian combination of the 4 parameters:

TABLE 2

| $C_1$ | 0.26 |
|-------|------|
| $C_2$ | 0.02 |
| $C_3$ | 0.02 |
| $C_4$ | 0.67 |
| $C_5$ | 0.02 |

The result obtained in Table 2 is not very compelling since 2 groups of parameters emerge clearly in Table 1:

The amalgamation $\{P_1, P_4\}$, which is in favour of the candidate $C_1$; and the amalgamation $\{P_2, P_3\}$ in favour of the candidate $C_4$.

If the probabilities of the candidate modes for these amalgamations are now computed, Table 3 is obtained, still with the Bayesian combination rule (combination of 2 amalgamations of 2 parameters):

TABLE 3

|       | {$P_1$, $P_4$} | {$P_2$, $P_3$} |
|-------|----------------|----------------|
| $C_1$ | 0.96           | 0.01           |
| $C_2$ | 0.01           | 0.01           |
| $C_3$ | 0.01           | 0.01           |
| $C_4$ | 0.01           | 0.96           |
| $C_5$ | 0.01           | 0.01           |

Given the values reported in Table 3, performing an additional Bayesian combination of the probabilities obtained makes scarcely any sense other than to accord an unreasonable confidence to the very low probabilities. The amalgamations {$P_1$, $P_4$} and {$P_2$, $P_3$} having the same probability, it is not possible to clear an amalgamation.

The inadequacies of the prior art can also be revealed in the following case. Let us consider two candidates $C_1$ and $C_2$ described by normally distributed parameters with means $\mu_1$ and $\mu_2$ and covariances $\Sigma_1$ and $\Sigma_2$ respectively. We take for example 4 parameters and $\mu_1=[1,8,3,5]^T$, $\mu_2=[6,1,9,2]^T$, $\Sigma_1=2.I_4$ and $\Sigma_2=3.I_4$, where $I_4$ is the identity matrix of size 4×4—the values possibly having been learnt with a learning database. It is assumed that a track is received which is a realization of a class P which, because of the imperfections of the upstream processings, is a mixture of the parameters of $C_1$ and $C_2$. In this example the mixture is assumed to be a normal law with mean [$\mu_1(1)$, $\mu_2(2)$, $\mu_1(3)$, $\mu_2(4)$] and with covariance diag(2,3,2,3)—diag(.) designating the diagonal matrix of diagonal coefficients given by its arguments. Stated otherwise the realizations of P have their first and third parameters arise from $C_1$ and their second and fourth parameters arise from $C_2$. In order to analyse the separability of the classes, it may be shown that the optimal test making it possible to decide whether two realizations correspond to the same class is the comparison of a Mahalanobis distance with a threshold. Its performance ratings can be computed explicitly and are illustrated by FIG. 2.

Figure 2:
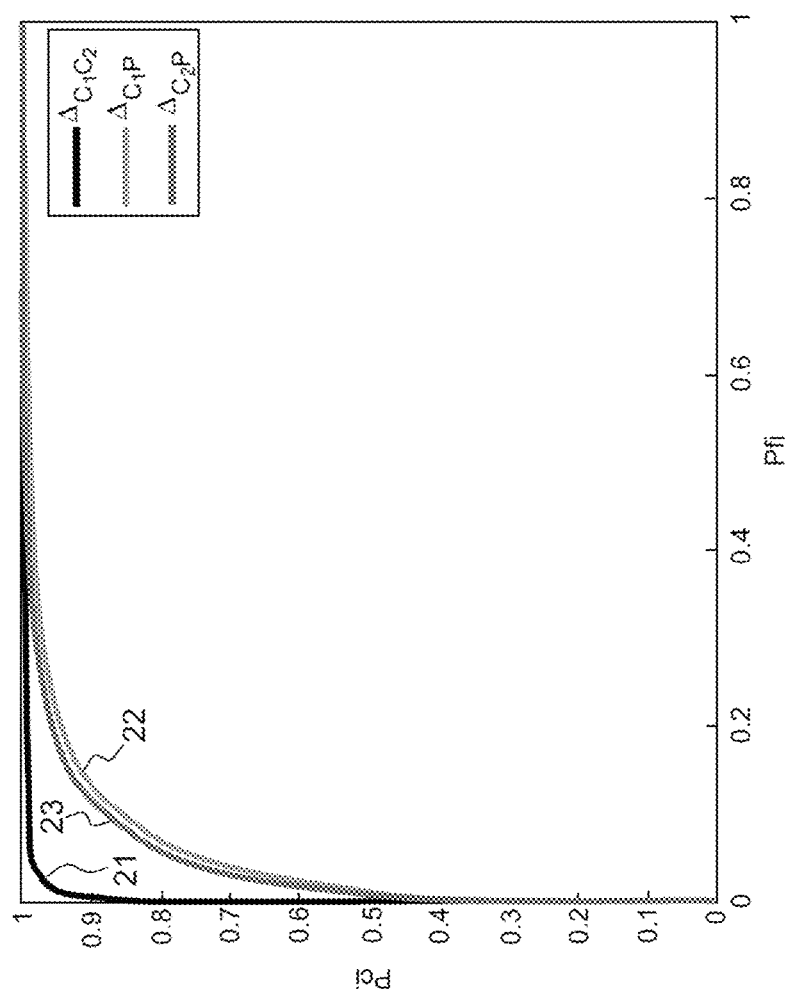
FIG. 2, curves illustrating the possibility of separating classes.

FIG. 2 presents curves in a system of axes, where the ordinate axis Pci and the abscissa axis Pfi correspond respectively to the probability of correct and of false identification.

The three curves 21, 22, 23 correspond respectively to the tests $\Delta_{C1C2}$, $\Delta_{C1P}$ and $\Delta_{C2P}$ making it possible to distinguish the classes $C_1$ and $C_2$, the classes $C_1$ and P, and the classes $C_2$ and P, respectively. A probability Pci of 1 signifies that two realizations arising from the two classes considered do not coincide with probability 1. A probability Pfi of 1 signifies that two realizations arising from the same class are not associated with the same class with probability 1. FIG. 2 illustrates the degradation of the identification capabilities since, to separate the mixed class P from $C_1$ or from $C_2$ (cf. curves 22 and 23), it is necessary to admit a large Pfi (greater than 0.5) in order to be able to properly separate P from $C_1$ or from $C_2$ whilst in the ideal case (curve 21) a Pfi of less than 0.05 is sufficient.

To overcome these inadequacies of the prior art, the method according to the invention carries out in particular the formation, based on analysing the conflicts between parameters, of amalgamations of the latter. The notion of conflict has been introduced into the field of data fusion and is defined in a very general manner within the framework of several formalisms which are useful in identifying radar modes (probabilities, possibilities, credibilities). In addition to the flexibility in the choice of application framework, the invention makes it possible to rapidly reveal the amalgamations of parameters, and thus to provide a better understanding of the uncertainties involved in the identification mechanism.

Figure 3:
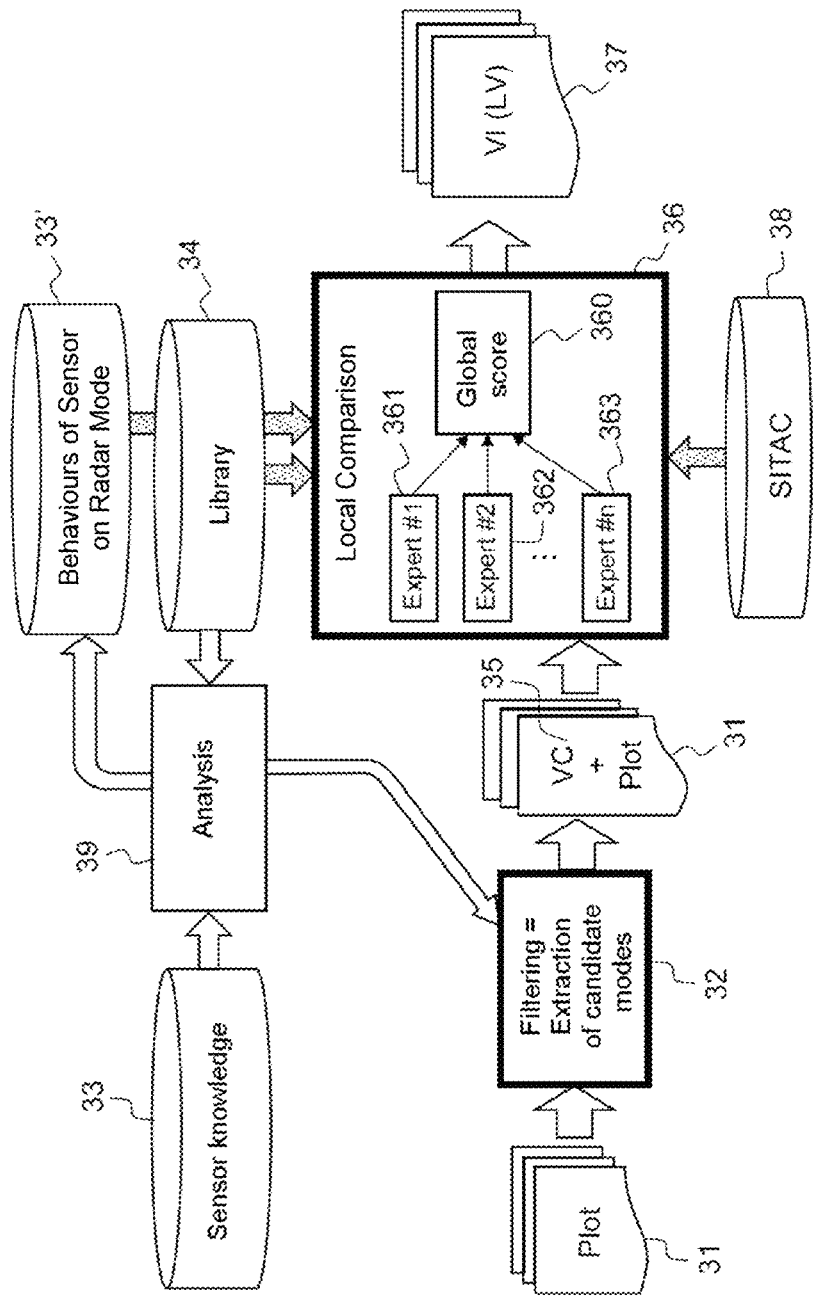
FIG. 3, an exemplary embodiment of a system implementing the invention.

FIG. 3 illustrates an exemplary system implementing the possible steps of the method according to the invention.

Before presenting the invention in greater detail, it is recalled that a system for identifying radar modes conventionally breaks down into three parts:

The first part consists, based on an interception of a radar mode, in selecting a restricted number of candidate modes arising from a reference database;

The second part consists in assigning a probability mass to each candidate mode based on the moments of the measured parameters (histograms modalities) and on similarity indices that are well suited to categorical or mixed data;

The third part analyses the scores on the basis of the probability masses and of the similarity indices.

The present invention pertains in particular to this third step. The invention is distinguished from the prior art schemes in particular by a principle: most algorithms use a weighted sum of partial indices, without bringing to the fore the conflict between the partial proofs afforded by each characteristic of the track whose mode it is sought to identify. However, it is from this sole measurement of conflict that the estimation of a confidence in the decision can result, as illustrated in the previous example. Thus, the solution according to the invention makes it possible to take account of the conflicts between the partial proofs afforded by each characteristic of a track to be identified. The partial proofs can include a possible rejection class where no class of the database corresponds to the measurement.

It should be noted that the proposed solution also opens the possibility of an additional processing step consisting in improving (by correcting and/or supplementing) the database. The conflict analysis introduced into the method according to the invention demonstrates a major benefit of this additional step.

As mentioned previously the proposed solution therefore falls within the framework of the main steps conventionally followed in an identification process. These steps, corresponding to the parts recalled succinctly above, can be described thus:

The first step consists of a first filtering of the candidates of the reference base with respect to more or less coarse characteristics of the track to be identified.

The second step consists in using finer characteristics of the track to be identified so as to determine an item of information conveying the quality of the fit between the track and each possible candidate of the reference base. According to the implementation variants, this item of information can be in particular a likelihood, a match, an amount of overlap, or a probability of identification but in all cases this entails quantifying the proximity between the detected track and a candidate mode.

The last step then consists in selecting that candidate or those candidates of the reference base which is (are) closest to the track to be identified.

The diagram of FIG. 3 depicts the principal steps of the identification, as well as the places where the specifics of the sensor are taken into account.

In the first step, on the basis of a track 31 (set of intercepted radar pulses), the extraction 32 of the candidate modes is carried out. This extraction is carried out on the basis of knowledge of the specifics of the sensor 33, 33' receiving the radar signal, and of a library 34 of radar modes, this library constituting a reference database. The analysis 39 of the library, prior to identification, delivers trees of intervals for fast selection of the candidate modes in the extraction phase 32.

The candidate modes, formatted for example in the form of vectors 35, are obtained as extraction output 32. These vectors and the detected track 31 are then processed in the second step 36. In this step, for each candidate mode, metrics 361, 362, 363 are established on each characteristic of the track 31. Next a global synthesis of these metrics is carried out to culminate in a global scoring 360. Likelihood vectors 37 are obtained as output from this step, the candidate mode retained being that of greatest likelihood.

If relevant, the method can also use in the second step 36 knowledge of a priori probabilities by virtue of knowledge of a tactical situation 38.

The method according to the invention can be implemented by several types of systems. Means for receiving radar signals and processing means, which comprise in particular the database 34, at least are necessary. The system can be of the ESM type (radar detector), but it may also be a radar.

The possible steps of the method according to the invention are described hereinafter in greater detail:
The selection 32 of the candidate modes by tree of intervals;
The scoring 36 of the candidate modes;
The analysis of the scores, by introducing measurements of conflict and the amalgamations of parameters.

Selection of the Candidates

The objective of this step 32 is to reduce the computational cost of implementation by generating a restricted list of possible signatures for the track measured by virtue of an inexpensive mechanism. It relies on a fast mechanism for indexing the data. The index used must be constructed so as to guarantee the selection of the correct signature from among the candidate signatures with fine scoring, even in the presence of false measurements (so-called "tolerant" indexing).

Figure 4:
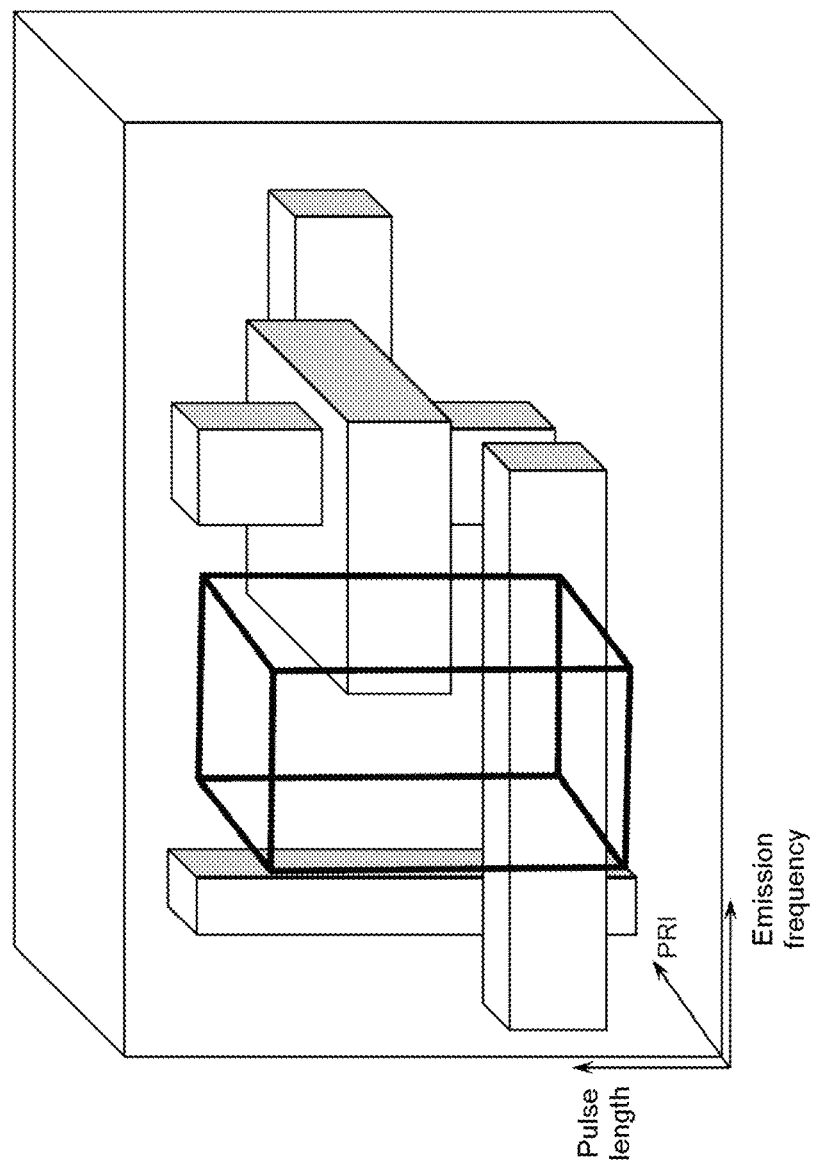
FIG. 4, an illustration of an exemplary mode of selection of three parameters.

A first selection of possible candidates is performed here, based on typical parameters of frequency, pulse length and PRI. The intervals of possible variation between the measured parameter and the parameter described in the database (library 34) for each of the modes are compared, as is illustrated by FIG. 4. A very effective way of carrying out this comparison is to proceed by binary trees of intervals [32], parameter by parameter.

FIG. 4 represents radar modes in 3-dimensional space, each dimension corresponding to a parameter, for example the emission frequency, the PRI and the pulse length. On each of the dimensions, a segment is an interval of values for the associated parameter. Each mode is thus represented by a parallelepiped, whose ends are the minimum and maximum values, described in the database 34, of each of the three parameters. The minimum and maximum values can be obtained by any modes of intelligence.

FIG. 4 presents several parallelepipeds, each corresponding to a candidate mode.

A prior analysis makes it possible to structure the database into binary search trees.

An intercepted track is indexed by passing the intervals of values measured for each of its parameters (emission frequency, PRI, pulse lengths for example) into the corresponding trees of intervals, and by retaining all the intervals which intercept them, that is to say having a non-empty intersection with the intervals associated with the measured track, so that a mode that may possibly be observed in an incomplete manner or with outlier values is retained with a database of modes which may themselves possibly be ascertained partially. In the example of FIG. 4, this method results in a list of candidates in relation to frequency, another list in relation to pulse length, and a further list in relation to PRI. The selected candidates ultimately being those which have a parallelepiped having a non-empty intersection with other parallelepipeds.

The union of the three lists provides the list of subject candidates for scoring in the following step. FIG. 4 presents an example of indexing with three parameters but it is possible to extend this mode of selection to N parameters, the representation then being extended to N dimensions.

Scoring of the Candidates

According to the invention, the candidate modes are scored based on two principles described hereinafter, these two principles being the use of the moments of the parameters and the use of the indices of similarity between categorical variables. In this step, the invention, in an original and judicious manner, makes joint use of these two principles, known separately elsewhere, to assign a score to the candidate modes.

In this step, the restriction, for example, to solely the intervals of values taken by the parameters of the candidate modes retained in the previous step, is now lifted. Returning to the example of FIG. 4, the new algorithm scores the candidates on the basis of the moments of PRI, of frequencies as well as of pulse lengths. The descriptions by moments are finer than the descriptions by intervals of minimum/maximum values, and make it possible in particular to distinguish modes that would not be distinguishable by intervals, as illustrated by the following figure.

Figure 5:
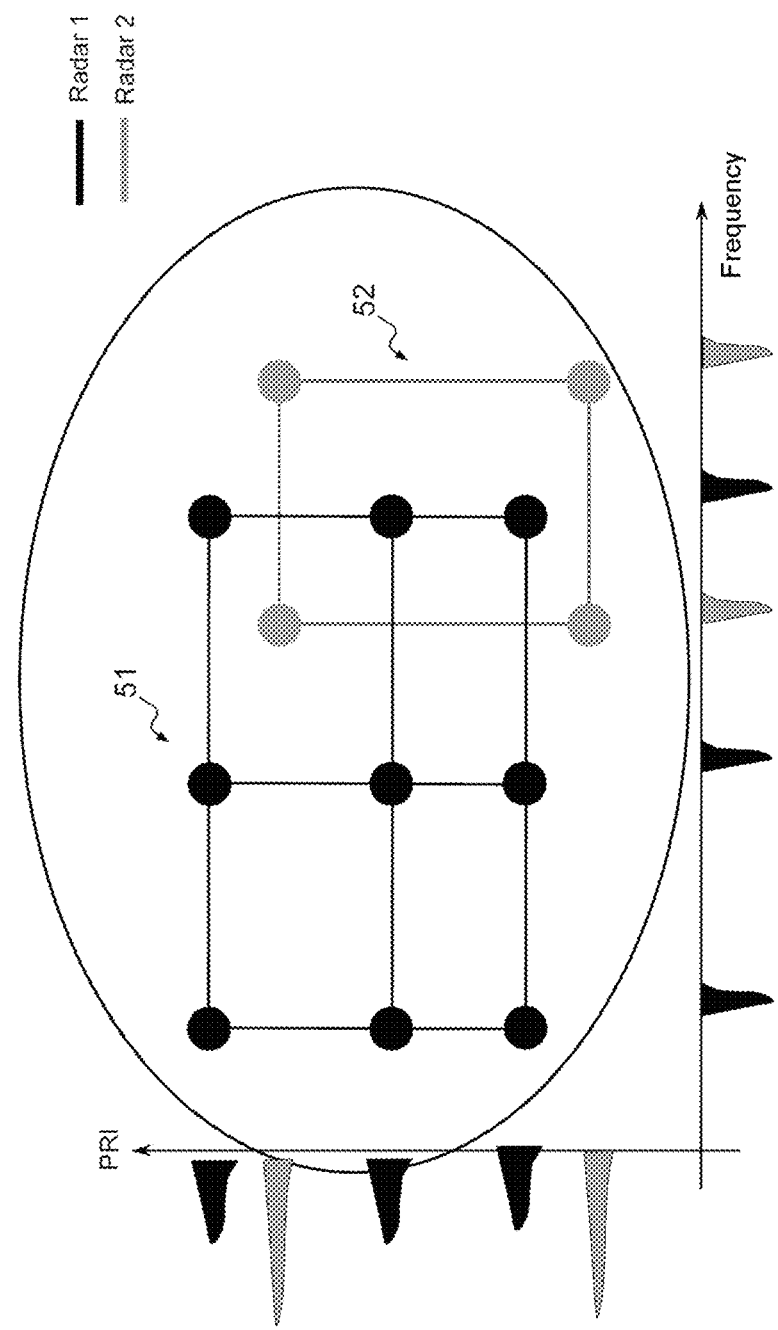
FIG. 5, an illustration of the distinguishing of two radar modes by moments of frequency and of differential time of arrival (PRI)

In FIG. 5, two radar modes 51, 52 are represented, in black and in grey, in the emitted frequencies/PRI plane. More precisely the black dots represent the pairs (frequency, PRI) of a first mode and the grey dots represent the pairs (frequency, PRI) of a second mode.

These modes 51, 52 overlap. Indeed, they are not separated by the intervals of the parameters since there exists at least one value of frequency of one of the modes which is bracketed by two values of frequencies of the other mode, and likewise for the PRI (stated otherwise, for each parameter, the interval of values in one of the modes intercepts the interval of values in the other mode). In practice, in certain frequency bands there are practically only multifrequency and multi-PRI radars which are agile over large intervals. Knowledge of the intervals then plays a part only in the selection of candidates by indexation. Identification, in order to be relevant, must necessarily use finer descriptions than intervals of values.

Moreover, experience shows that the use of the moments offers greater robustness than the use of the histograms of the values taken by the parameters. For example, a partial interception of a given mode leads to a measured histogram whose support is included in that of the histogram described in the library, but, the distribution of whose weights may be very different. The measurements of distance between densities such as φ-divergences [33] are then liable to provide results that are not very robust.

The other principle on which the scoring of the candidates is based is to use indices of similarities between the moments of a parameter of the unknown track and the moments of the same parameter in a candidate mode. Here, the parameters are considered to be categorical. Indeed, there is no order relation between two radar modes, even if the numerical values of some of their parameters are ordered. Thus the angular (rotating, sectorial, random etc.) scan mode, for example, is not a quantitative but a categorical parameter since there is no order relation between its parameters (rotating, sectorial, random . . . ).

Likewise the quantitative parameters (frequency, PRIs etc.), though ordered naturally by their numerical values, do not convey an order amongst the radar modes. The absence of any order relation amongst the radar modes is the reason why their parameters are considered to be categorical and why the similarity indices which make it possible to measure a resemblance between them are used as basis. There exists a very great variety of similarity indices [33] and the choice of an index is not critical to the solution implemented by the invention. More generally, it is even possible to use a different index per parameter. In an implementation variant, the use of the Jaccard index [33] is proposed, with a formalism of probabilistic type, as will be described hereinafter.

The index of similarity between the moments of a parameter of the unknown track and the moments of this same parameter in a candidate mode then makes it possible to quantify a notion of conflict between the partial identifications provided by several parameters.

It is recalled that, in the field of data fusion, one conventionally distinguishes [31]:

Conjunctive operators (T-norms), which are used when the information originating from the various information sources is consistent, that is to say conflict-free. The belief mass is then accorded to the intersection of the assumptions in such a way as to eliminate the information which is at one and the same time affirmed by one source and totally rejected by the other.

Disjunctive operators (T-conorms), which are used when significant inconsistency is revealed. If despite this inconsistency it is decided to associate the data, the belief mass is accorded to the union of the assumptions present.

According to the formalism adopted, probabilistic, possibilistic, or credibilistic, the conjunctive and disjunctive operators are expressed in a different way. In an implementation variant with a probabilistic framework, an example of conjunctive and disjunctive operators is the following, for two probability masses $m_1$ and $m_2$ of a candidate mode A:

$$(m_1 \otimes m_2)(A) = \frac{m_1(A) \cdot m_2(A)}{\sum_B m_1(B)m_2(B)};$$

$$(m_1 \oplus m_2)(A) = \frac{m_1(A) + m_2(A)}{2}.$$

Here, $m_1$ and $m_2$ are the probability masses of the candidate mode A for two given different parameters, and $m_1 \oplus m_2$ (respectively $m_1 \otimes m_2$) is the probability mass of the mode A when these parameters are fused into an amalgamation of disjunctive (respectively conjunctive) type.

In another implementation variant in a possibilistic framework, an example of conjunctive and disjunctive operators is the possibilistic minimum and maximum respectively, this time for two measurements of possibilities $m_1$ and $m_2$ of a candidate mode A:

$$(m_1 \otimes m_2)(A) = \frac{\min(m_1(A), m_2(A))}{\sup_B \min(m_1(B), m_2(B))},$$

$$(m_1 \otimes m_2)(A) = \frac{\max(m_1(A), m_2(A))}{\sup_B \max(m_1(B), m_2(B))},$$

where B is a dummy variable which runs through the set of candidate modes.

Yet another implementation variant in a credibilistic framework would use the Dempster-Shafer combination as conjunctive operator, for two belief masses $m_1$ and $m_2$ associated with a candidate mode A:

$$\begin{cases} (m_1 \otimes m_2)(A) = \dfrac{\sum_{B \cap C = A} m_1(B)m_2(C)}{\sum_{B \cap C \neq \emptyset} m_1(B)m_2(C)} \forall A \neq \emptyset \\ (m_1 \otimes m_2)(\emptyset) = 0 \end{cases};$$

$$\begin{cases} (m_1 \oplus m_2)(A) = \dfrac{\sum_{B \cup C = A} m_1(B)m_2(C)}{\sum_{B \cup C \neq \emptyset} m_1(B)m_2(C)} \forall A \neq \emptyset, \\ (m_1 \oplus m_2)(\emptyset) = 0 \end{cases}$$

where B and C run through the set of candidate modes.

There exist many other T-norms and T-conorms which may be appropriate (Lukasiewicz norm, drastic norm, nilpotent minimum norm, Hamacher norm, etc. together with their dual conorms [31]). In all cases, the degree of conflict between the sources mentioned in the previous paragraph can be measured via the re-normalization factor of the conjunctive part, as introduced in [29-31]. We thus have: the probabilistic conflict:

$$K = 1 - \sum_B P_1(B)P_2(B) \qquad (1)$$

the possibilistic conflict:

$$K = 1 - \sup_B \min(\pi_1(B), \pi_2(B)) \qquad (2)$$

and the credibilistic conflict:

$$K = 1 - \sum_{B \cap C = \emptyset} m_1(B)m_2(C) \qquad (3)$$

where B and C run through the set of candidate modes.

More generally the conflict is given by the 1-complement of the normalization of the conjunctive operator. Other variants for computing the conflict are possible, for example by taking account of the self-conflict. Nevertheless, the conflict K is all the greater the more inconsistent the sources are deemed to be. It thus makes it possible to weight the grouping between the conjunctive and disjunctive approach, this being the approach proposed by the invention.

The table of the conflicts between parameters, obtained according to the formalism chosen (probabilistic, possibilistic, credibilistic), is at the basis of the analysis of the scores in the following step. To fix ideas, by supplementing the frequency FR, pulse duration (DI) (or pulse length) and PRI parameters already considered above with the additional parameters ΔF (differences of emitted frequencies), DPRI (differences of PRI), type of intrapulse (IP) modulation, group time (TG) and type of scan, the table of conflicts can take the form of a triangular matrix. The following Table 4 is an example thereof:

TABLE 4

| Conflicts | FR | ΔF | PRI | DPRI | DI | IP | TG |
|---|---|---|---|---|---|---|---|
| ΔF | $K_{12}$ | | | | | | |
| PRI | $K_{13}$ | $K_{23}$ | | | | | |
| DPRI | $K_{14}$ | $K_{24}$ | $K_{34}$ | | | | |
| DI | $K_{15}$ | $K_{25}$ | $K_{35}$ | $K_{45}$ | | | |
| IP | $K_{16}$ | $K_{26}$ | $K_{36}$ | $K_{46}$ | $K_{56}$ | | |
| TG | $K_{17}$ | $K_{27}$ | $K_{37}$ | $K_{47}$ | $K_{57}$ | $K_{67}$ | |
| Scan | $K_{18}$ | $K_{28}$ | $K_{38}$ | $K_{48}$ | $K_{58}$ | $K_{68}$ | $K_{78}$ |

At this juncture the conflict is computed here between the parameters taken pairwise. The quantities Kij represent the conflict values and vary from 0 to 1.

Provision may be made for variant computations of conflicts between more than two parameters.

Analysis of the Scores

The third step consists in analysing the results obtained in the second, scoring, step so as to select the candidate or candidates of the reference base that is or are closest to the track to be identified.

For this purpose, the solution according to the invention exploits the conflicts between parameters in order to determine the amalgamations in favour of or against the decision, the decision being able to be the assigning of a candidate mode to the track, or a classing of the candidate modes with respect to the track to be identified. In addition to automatically extracting the subsets of parameters that agree, analysis of the conflicts also makes it possible to determine a global conflict which provides information about the confidence that may be accorded in the decision.

The method according to the invention then consists in grouping the least mutually conflicting parameters together by successive iterations so as to obtain a hierarchical classification of those parameters. The grouping of parameters entails the updating of tables of indices of similarity between the track and the candidate modes for the various parameters, the new computed indices taking conflicts into account. The invention performs the grouping of the least conflicting parameters and updates the similarity tables according to a conjunction and a disjunction which are weighted by the conflict between the fused sources.

In this regard, the "adaptive" operators [31] (in the sense that they depend on the conflict) are formulated with the notation ⊙, the following expression for which gives the similarity index table $m_{\{1,2\}}$ of the grouping $\{1, 2\}$ as a function of the tables $m_1$ and $m_2$ of the groups 1 and 2, as well as of the conflict K:

$$m_{\{1,2\}}(A) = m_1 \odot m_2(A) = (1-K) m_1 \otimes m_2(A) + K m_1 \oplus m_2(A) \quad (4)$$

In equation (4) the terms $m_1$, $m_2$ are either a probability mass, or a possibility, or a belief mass, and K designates the conflict in the corresponding formalism. The table $m_{\{1,2\}}$ thus gives the indices of similarity between the track and the various candidate modes for the grouping of parameters $\{1, 2\}$. The algorithm for fusing the partial identifications provided by the various parameters is shown diagrammatically in FIG. 6, where L is the number of parameters and t the iteration index varying from 0 to L.

Figure 6:
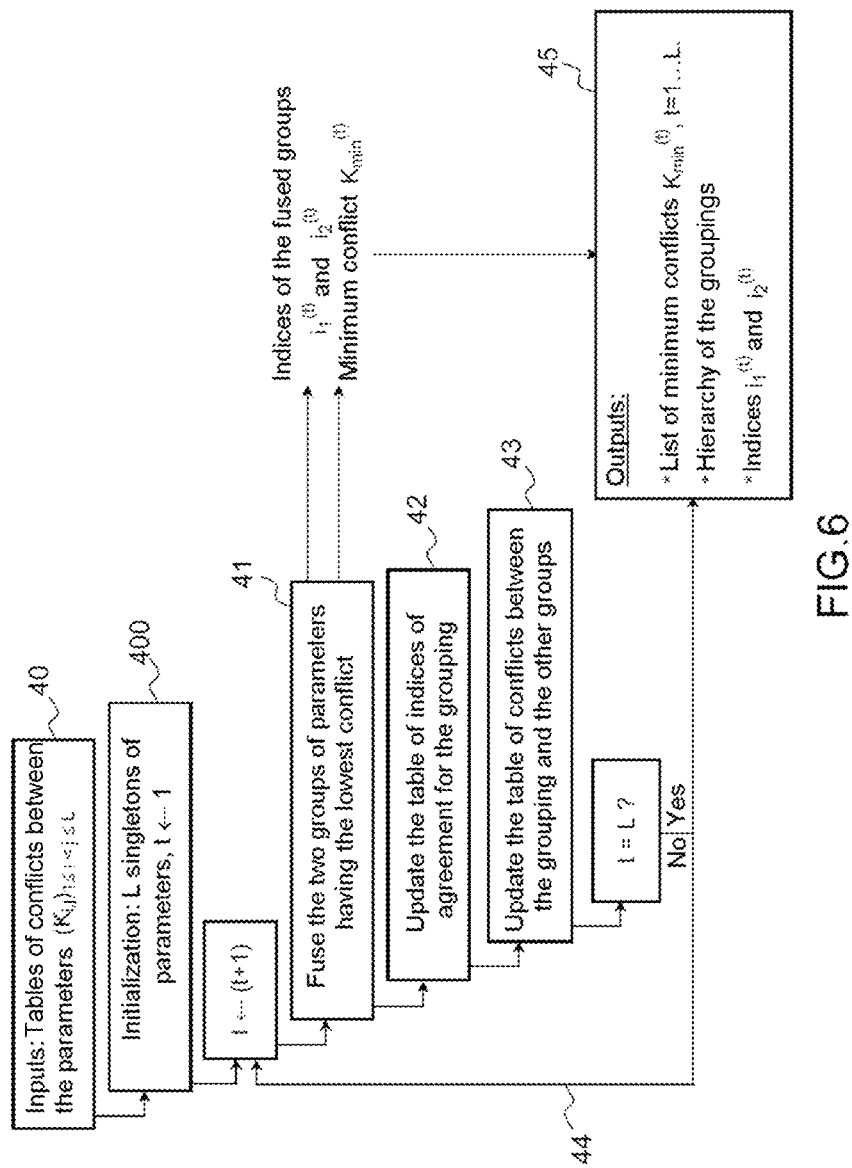
FIG. 6, an illustration of the process of analysis of the scorings and of the grouping of the parameters which is applied by the method according to the invention.

FIG. 6 illustrates the iterative process for analysing the scores leading to the amalgamation grouping of the parameters. This process is illustrated with regard to the conflicts table illustrated by Table 4, L being equal to 8. It groups the least mutually conflicting parameters together by successive iterations, the number of iterations being equal to 8 in this example.

The input parameters 40 are the parameters of the tables of conflicts, for a given table. In the initialization phase 400, the L parameters involved, for example the 8 parameters RF, ΔF, PRI, DPRI, DI, IP, TG and Scan of Table 4 are retained. The iterative process is then begun.

Each iteration comprises: a phase 41 of fusing the two groups of parameters having the lowest conflict; a phase 42 of updating the table of similarity indices for the grouping, according to equation (4); a phase 43 of updating the table of conflicts between the grouping obtained and the other groups.

Another iteration 44 is performed until the number of iterations reaches L.

At each iteration t the value of the minimum conflict $K_{min}^{(t)}$ that led to the grouping and the indices $i_1^{(t)}$ and $i_2^{(t)}$ of the two fused groups are stored. In this iterative process, what is called a group of parameters identifies one and the same parameter of all the candidate modes, for example the group of the PRIs. The indices $i_1^{(t)}$ and $i_2^{(t)}$ are therefore the similarity indices of the fused parameters for each candidate mode, if there are N candidate modes there are N indices $i_1^{(t)}$ and $i_2^{(t)}$.

As output 45 of the iterative process, after the L iterations, a list of the minimum conflicts $K_{min}^{(t)}$ and a hierarchy of the groupings are obtained via the lists of similarity indices $i_1^{(t)}$ and $i_2^{(t)}$, t varying from 1 to L. More precisely, a list of similarity indices is associated with each iteration of order t for all the candidate modes, these indices being those which were stored in the course of the iterations 1 to t.

Figure 7:
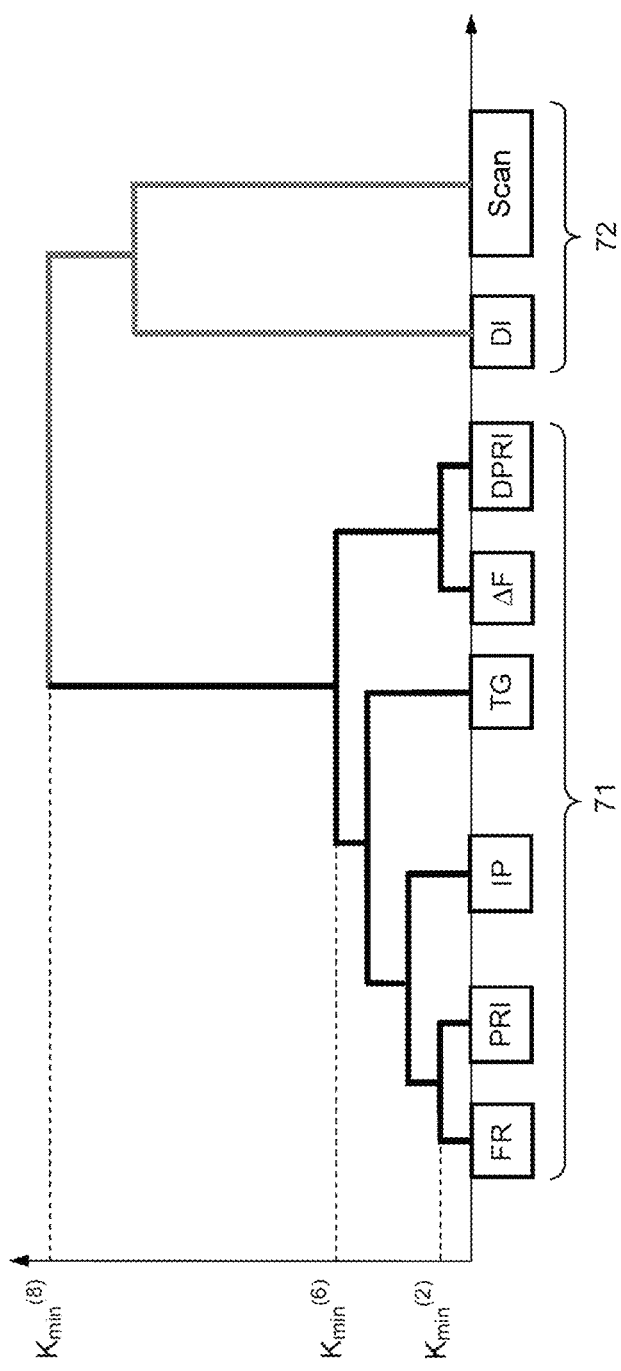
FIG. 7, a corresponding dendrogram of groupings of parameters following the process illustrated by FIG. 6.

If the series of the minimum conflicts $K_{min}^{(t)}$, t=1 ... L, is increasing, the results of the analysis described with regard to FIG. 6 can be presented to the operator in the form of a "dendrogram" [33], that is to say a chart used to visually illustrate the hierarchy of the groupings of the various parameters as a function of the values of minimum conflict at each iteration. FIG. 7 represents a dendrogram of the 8 parameters considered for the example of Table 4.

The values of the series of conflicts $K_{min}^{(t)}$ are distributed into several distinct groups of close values. It is thus possible to distinguish amalgamations of parameters. In FIG. 7, for example, $K_{min}^{(6)}$ makes it possible to distinguish two amalgamations 71, 72 of parameters which are {FR, PRI, IP, TG, DF, DPRI} and {DI, Scan}.

Identification then consists in choosing the grouping whose conflict is below a given maximum conflict threshold, that may for example be chosen by the operator in the list of the minimum conflicts. With this grouping is associated a list of indices of similarity with the candidate modes. In this list, the component of highest level gives the index of the candidate mode retained first. The other candidate modes can be classed in sequence, the value of the conflict associated with each amalgamation playing the role of an index of confidence in the decision. Finally, the geographical location of the emitter to be identified makes it possible, when it is available, to heighten the identification: a ship-mounted radar mode can reasonably originate only from an emitter located on the sea, for example.

In the course of an iteration of the analysis described by FIG. 6, it may sometimes happen depending on the situation that the minimum conflict between a grouping and the other groups of parameters is slightly lower than the smallest of the conflicts before grouping (the series $K_{min}^{(t)}$, t=1 ... L, is then not increasing). This is the case when the grouping of three given parameters (or three given groups of parameters) is less inconsistent that any of the groupings of these parameters (or groups of parameters) taken pairwise, this being relatively rare, but possible. In those cases, it is clear that the analysis must be adapted so as to group together the three parameters or groups of parameters, by adapting the computations of the conflict and of the grouping table (equation 4) to three elements in the iteration concerned. For a candidate mode A:

$$m_{\{1,2,3\}} = m_1 \odot m_2 \odot m_3(A) = (1-K)m_1 \otimes m_2 \otimes m_3(A) + Km_1 \oplus m_2 \oplus m_3(A) \quad (5)$$

the conflict K being modified accordingly, that is to say:

$$K = 1 - \Sigma_B m_1(B) m_2(B) m_3(B) \text{ in a probabilistic framework,}$$

$$K = 1 - \sup_B \min(m_1(B), m_2(B), m_3(B))$$

in a possibilistic framework, or $K = 1 \Sigma_{B \cap C \cap D = \emptyset} m_1(B) m_2(C) m_3(D)$ in a credibilistic framework, B, C, D running through the set of candidate modes. Such an adaptation (equation 5) makes sense by virtue of the associativity property of T-norms and T-conorms [31]. The analysis then ultimately provides a hierarchical structure, albeit one which is not binary (that is to say with nodes of more than two branches). One thus obtains a "hierarchy" [33], which is a less refined structure than the dendrogram but which is nevertheless useful for extracting parameter amalgamations.

After having described the steps of selection, scoring and analysis, a possible mode of implementation is now described.

One way of measuring the similarity between the moments measured on an unknown track and the moments of a signature of a candidate mode of the database is to compute the so-called "Jaccard" index [33] which is highly suitable for comparing the similarity (or the dissimilarity) between parameters of two radar modes.

The Jaccard index is defined here for two sets X and Y which correspond to the sets of values of a given parameter, respectively for the track and for a candidate mode. It is computed on the basis of the following magnitudes, where |X| designates the cardinal of the set X:

The number of values of the parameter considered which are common to the track and to the candidate mode:

$N_1 = |X \cap Y|$.

The number of values taken by the parameter in the track but not in the candidate mode:

$N_2 = |X \cap \overline{Y}|$.

The number of values taken by the parameter in the candidate mode but not in the track:

$N_3 = |\overline{X} \cap Y|$.

The Jaccard index then equals:

$$S = \frac{N_1}{N_1 + N_2 + N_3}.$$

For a given parameter, the computation of an index of similarity such as the Jaccard index between the track and the candidate modes makes it possible to obtain, after renormalization, the equivalent of a probability table of agreement between the track and the candidate modes (a probability mass).

For example for N candidate modes and a given parameter a, a possibly being the frequency, or the PRI, etc., the probability table, for the parameter a, for the agreement between the track P and the candidate modes $(M_k)_{k=1 \ldots N}$ is, with the Jaccard index $S_a(.|.)$:

$$\begin{pmatrix} \pi_a(P/M_1) \\ \pi_a(P/M_2) \\ \pi_a(P/M_3) \\ \ldots \\ \pi_a(P/M_N) \end{pmatrix} = \frac{1}{k_a} \begin{pmatrix} S_a(P/M_1) \\ S_a(P/M_2) \\ S_a(P/M_3) \\ \ldots \\ S_a(P/M_N) \end{pmatrix} \text{ with } k_a = \sum_{k=1}^{N} S_a(P/M_k).$$

A global agreement $C_{ab}$ between 2 parameters a and b can then be obtained by multiplying the partial agreements:

$$C_{ab} = \sum_{k=1}^{N} \pi_a(P/M_k) \cdot \pi_b(P/M_k) \quad (6)$$

The agreement is always positive as a sum of positive terms. It is bounded by the Cauchy-Schwartz inequality. It may be shown that:

$$C_{ab} \leq \sqrt{\max\left(\frac{1}{2}, \sup \pi_a\right) \max\left(\frac{1}{2}, \sup \pi_b\right)}.$$

The two tables $\pi_a$ and $\pi_b$ have at most one value greater than ½ (since their sum equals 1). If the maximum values of the two tables are both less than ½ then the agreement is bounded by ½. If the maximum values of the two tables are both greater than ½ then the agreement is bounded by their geometric mean, which then lies between ½ and 1. The conflict which is the 1-complement of the global agreement is then introduced:

$$K_{ab} = 1 - C_{ab} \quad (7)$$

A table of the conflicts between the parameters is available on completion of this step. Certain parameters may be in favour of an identification whilst others may go against, and this is summarized by the conflicts table.

The analysis of the conflicts forms the subject of the last analysis step:

For the grouping of two parameters a and b, the following is obtained for the k-th candidate mode $M_k$:

$$\pi_{\{a,b\}}(P/M_k) = (1 - K_{ab}) \cdot \frac{\pi_a(P/M_k) \cdot \pi_b(P/M_k)}{\sum_{j=1}^{N} \pi_a(P/M_j) \cdot \pi_b(P/M_j)} + K_{ab} \cdot \frac{\pi_a(P/M_k) + \pi_b(P/M_k)}{2};$$

For the grouping of two groups of parameters A and B, it is necessary to take account of the number of component parameters $n_A$ and $n_B$ making up each of the groups. The conjunctive part is given by:

$$\pi_{A.B}(P/M_k) = \frac{\pi_A(P/M_k)^{n_A} \cdot \pi_A(P/M_k)^{n_B}}{\sum_{j=1}^{N} \pi_A(P/M_j)^{n_A} \cdot \pi_A(P/M_j)^{n_B}};$$

and the disjunctive part is given by:

$$\pi_{A+B}(P/M_k) = \frac{n_A \cdot \pi_A(P/M_k) + n_B \cdot \pi_B(P/M_k)}{n_A + n_B}.$$

The agreement table for the grouping of the two groups A and B is then:

$$\pi_{\{A,B\}}(P/M_k) = (1-K_{ab}) \cdot \pi_{A.B}(P/M_k) + K_{ab} \cdot \pi_{A+B}(P/M_k).$$

Returning to the example of Table 1 and computing the conflicts between the parameters pairwise according to equations 6 and 7, the minimum conflict is found to be that between the parameters $P_1$ and $P_4$, being equal to $K_{\{14\}}=0.4755$.

The grouping $\{P_1, P_4\}$ leads to the updated table of probabilities (which is a particular similarity table) with: $\Pi_{\{14\}}=[0.84, 0.04, 0.04, 0.03, 0.04]$.

Computation of the conflicts between the parameters $P_2$, $P_3$ and the grouping $\{P_1, P_4\}$ shows that the smallest of the conflicts is that between the parameters $P_2$ and $P_3$, being equal to $K_{23}=0.4833$.

The grouping $\{P_2, P_3\}$ leads to the updated table with: $\pi_{\{23\}}=[0.025, 0.045, 0.045, 0.84, 0.048]$.

Figure 8:
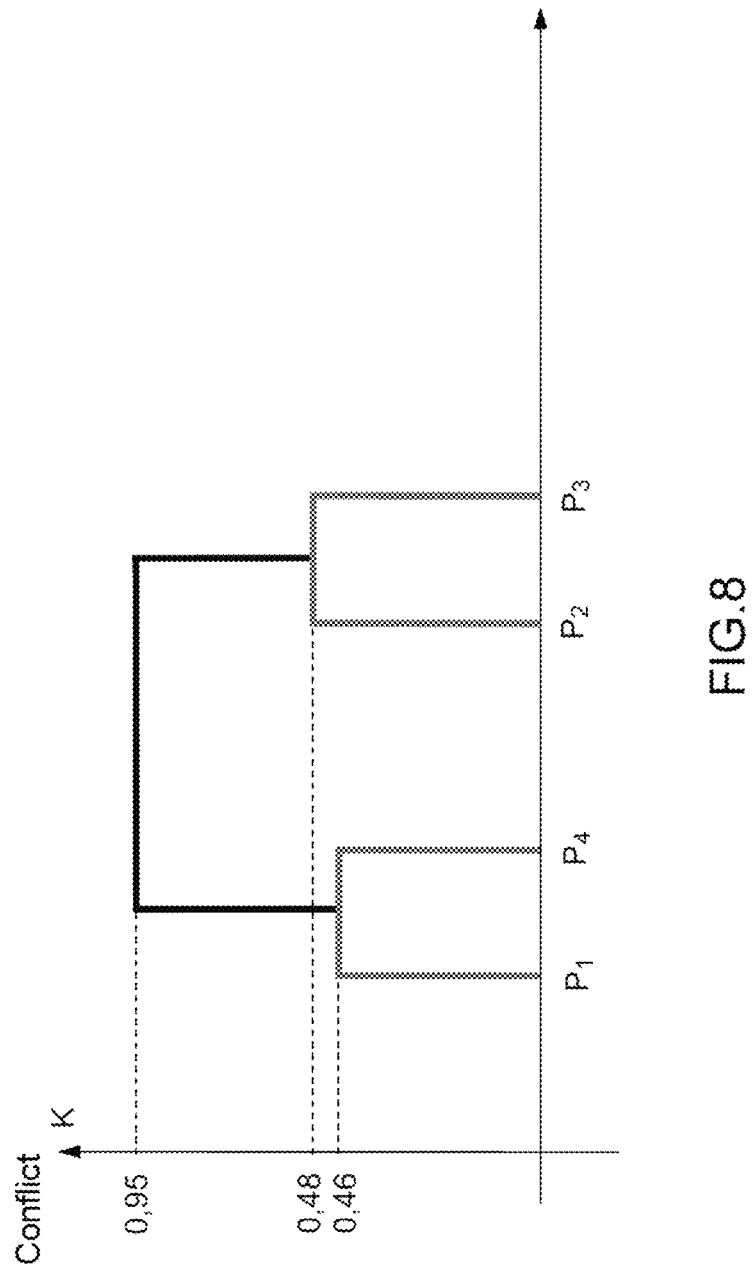
FIG. 8, another exemplary dendrogram.

Finally, the conflict between the two groupings $\{P_1, P_4\}$ and $\{P_2, P_3\}$ is $K_{\{\{14\}\{23\}\}}=0.95$. This results in an analysis similar to the analysis of the Bayesian fusions but with an index of the conflicts between the parameters taken pairwise. The dendrogram obtained is represented in FIG. 8.

This dendrogram might be presented to an operator who then selects the radar mode retained as a function of the conflict values displayed. In this example the conventional schemes do not make it possible to discriminate the candidate mode $C_1$ from the candidate mode $C_4$. With the amalgamation grouping of the parameters the invention makes it possible to discriminate these modes. The operator can thus retain the mode $C_1$ for which the grouping of parameters $\{P_1, P_4\}$ exhibits the lowest conflict.

Likewise in the example relating to FIG. 2, the introduction of the amalgamations of the parameters $\{1,3\}$ and $\{2,4\}$ in accordance with the invention makes it possible to recover performance levels close to the ideal case in the cases of mixing.

The invention advantageously uses the notion of conflict, this notion being able to be defined in a very general manner within the framework of several formalisms which are useful for identifying radar modes (probabilities, possibilities, credibilities). In addition to the flexibility of choice of the application framework, the invention makes it possible to rapidly reveal the amalgamations or groupings of parameters, and thus to provide a better understanding of the uncertainties involved in the identification mechanism.

The invention has been described in respect of the identification of waveforms. It may nonetheless apply in respect of the identification of other types of objects.

REFERENCES CITED

[1] D. C. Schleher, "Introduction to Electronic Warfare", *Artech House*, Dedham (MA), USA, 1986.

[2] C. Brolly et al., "Application de la théorie de l'information pour l'extraction passive radar en guerre électronique marine", 16th *colloquium GRETSI*, pp. 603-606, Grenoble, France, 15-19 Sep. 1997.

[3] P. R. Kumar et al., De-Interleaving and Identification of Pulsed Radar Signals Using ESM Receiver System, *International Journal of Advanced Research in Electrical, Electronics and Instrumentation Engineering*, vol. 4, no. 7, pp. 6243-6252, July 2015.

[4] A. M. Kilincarslan, A. Kara, "Identification of Highly Jittered Radar Emitters: Issues on Low Cost Embedded Design", *International Conference on Computing and Information Technology*, vol. 2, pp. 739-744, Medinah, Saudi Arabia, 2012.

[5] J. Roe, A. Pudner, "The Real-Time Implementation of Emitter Identification for ESM", *IEE Colloquium on Signal Processing in Electronic Warfare*, pp. 7/1-7/6, London, UK, 31 Jan. 1994.

[6] G. A. Carpenter et al., "Fuzzy ARTMAP: A Neural Network Architecture for Incremental Supervised Learning of Analog Multidimensional Maps", *IEEE Trans. Neural Networks*, vol. 3, no. 5, pp. 698-713, September 1992.

[7] E. Granger et al., "Comparison of Classifiers for Radar Emitter Type Identification", C. H. Dagli et al. Eds., *Intelligent Engineering Systems Through Artificial Neural Networks*, vol. 9, pp. 3-11, New York, USA, 1999.

[8] E. Granger et al., "A What-and-Where Fusion Neural Network for Recognition and Tracking of Multiple Radar Emitters", *Technical Report CAS/CNS-TR*-2000-029, Boston University, Boston (Mass.), USA, December 2000.

[9] M. Conning, F. Potgieter, "Analysis of Measured Radar Data for Specific Emitter Identification", *IEEE Radar Conference*, pp. 35-38, Washington D.C., USA, 10-14 May 2010.

[10] S. A. Hassan et al., "Emitter Recognition using Fuzzy Inference System", *IEEE International Conference on Emerging Technologies*, pp. 204-208, Islamabad, Pakistan, 17-18 Sep. 2005.

[11] Y. M. Chen et al., "Identification of Highly Jittered Radar Emitters Signals based on Fuzzy Classification", *IOSR Journal of Engineering*, vol. 3, no. 10, pp. 53-59, October 2013.

[12] Y. M. Chen et al., "Emitter Identification of Electronic Intelligence System Using Type-2 Fuzzy Classifier", *Systems Science & Control Engineering*, vol. 2, pp. 389-397, 2014.

[13] W. Rui-Jia, W. Xing, "Radar Emitter Recognition in Airborne RWR/ESM Based on Improved K Nearest Neighbor Algorithm", *IEEE International Conference on Computer and Information Technology*, pp. 148-151, Xi'an, China, 11-13 Sep. 2014.

[14] L. Li, H. Ji, "Combining Multiple SVM Classifiers for Radar Emitter Recognition", *Proc. 6th International Conference on Fuzzy Systems and Knowledge Discovery*, p. 140-144, Yantai, China, 16-16 Aug. 2010.

[15] Z. Yang et al., "Hybrid Radar Emitter Recognition Based on Rough k-Means Classifier and Relevance Vector Machine", *Sensors*, vol. 13, pp. 848-864, 2013.

[16] L. E. Langley, "Specific Emitter Identification (SEI) and Classical Parameter Fusion Technology", WESCON93, pp. 377-381, San Francisco (Calif.), USA, 28-30 Sep. 1993.

[17] S. D'Agostino et al., "Specific Emitter Identification: Analysis on Real Radar Signal Data", *Proc. of the 6th European Radar Conference*, pp. 242-245, Rome, Italy, 30 Sep.-2 Oct. 2009.

[18] J. Dudczyk, A. Kawalec, "Fractal Features of Specific Emitter Identification", *Acta Physica Polonica series A*, vol. 124, no. 3, pp. 406-409, October 2013.

[19] D. Shaw, W. Kinsner, "Multifractal Modelling of Radio Transmitter Transients for Classification", WESCANEX97: *Communications, Power and Computing*, pp. 306-312, Winnipeg, Man., 22-23 May 1997.

[20] Y.-J. Yuan et al., "Specific Emitter Identification based on Transient Energy Trajectory", *Progress In Electromagnetic Research C*, vol. 44, pp. 67-82, 2013.

[21] A. Aubry et al., "Cumulants-Based Radar Specific Emitter Identification", *IEEE International Workshop on Information Forensics and Security*, pp. 1-6, Foz do Iguaçu, Brazil, 29 Nov.-2 Dec. 2011.

[22] T. Han, Y. Zhou, "Intuitive Systemic Models and Intrinsic Features for Radar-Specific Emitter Identification", F. Sun et al. (eds), *Foundations and Practical Applications of Cognitive Systems and Information Processing*, Advances in Intelligent Systems and Computing 215, pp. 153-160, Springer-Verlag, Berlin/Heidelberg, Germany, 2014.

[23] J. Dudczyk, A. Kawalec, "Specific Emitter Identification based on Graphical Representation of the Distribution of Radar Signal Parameters", *Bulletin of the Polish Academy of Sciences—Technical Sciences*, vol. 63, no. 2, pp. 391-396, 2015.

[24] Y. Shi, H. Ji, "Kernel Canonical Correlation Analysis for Specific Radar Emitter Identification", *Electronics Letters*, vol. 50, no. 18, pp. 1318-1320, August 2014.

[25] J.-F. Grandin, "Information Fusion. Theory at Work", in Hassan Fourat (ed.): *Multisensor Data Fusion—From Algorithms and Architectural Design to Applications*, CRC-Press, 2015.

[26] J.-F. Grandin, C. Moulin, "What Practical Differences Between Probabilities, Possibilities, and Credibilities", *Proc. SPIE* vol. 4731, Sensor Fusion: Architectures, Algorithms, and Applications VI, 86, March 2002.

[27] D. Dubois, H. Prade, "Théorie des Possibilités", Masson, Paris, 1985.

[28] D. Dubois, H. Prade, "Combination of Fuzzy Information in the Framework of Possibility Theory", in M. A. Abidi and R. C. Gonzalez (eds), *Data Fusion in Robotics and Machine Intelligence*, pp. 481-505, Academic Press, New York, USA, 1992.

[29] D. Dubois, H. Prade, "Possibility Theory and Data Fusion in Poorly Informed Environments", *Control Engineering Practice*, vol. 2, pp. 812-823, 1994.

[30] M. Oussalah, "Study of Some Algebraical Properties of Adaptive Combination Rules", Fuzzy Sets and Systems, vol. 114, no. 3, pp. 391-409, September 2000.

[31] M. Oussalah, "Data Fusion: A Study of Adaptive Combinations with Incomplete Certainty Qualification", *Kybernetes*, vol. 35, no. 9, pp. 1452-1491, 2006.

[32] F. Pfenning, "Lecture Notes on AVL Trees", *Lecture Notes* 15-122, n. 18, Carnegie Mellon University, March 2011.

[33] H.-H. Bock, E. Diday (eds.), "Analysis of Symbolic Data—Exploratory Methods for Extracting Statistical Information from Complex Data", Springer-Verlag, Berlin/Heidelberg, 2000.

The invention claimed is:

1. A method for identifying modes of radar emission by a system for detecting radar signals, a mode being characterized by a set of parameters, the method comprising:
    a first step selecting a restricted number of candidate modes arising from a database on the basis of the interception of an unknown radar mode to be identified able to be characterized by a number L of given parameters;
    a second step performing a scoring:
        by assigning a similarity index to each of the said L parameters, for each candidate mode, the said index being the index of similarity between the moment of the parameter of the candidate mode and the moment of the same parameter of the unknown mode and;
        by computing a value of conflict between the said parameters taken pairwise, computation performed on the basis of the indices of similarity of moments of each of the said parameters;
    a third step consisting in grouping together, by successive iterations, the said L parameters in such a way that, at each iteration:
        the two parameters having the lowest conflict value ($K_{min}^{(t)}$) are grouped together;
        the similarity indices of the moments of the other parameters are computed for the grouping;
        the updating of the conflicts is performed by computing the value of conflict between the grouping and the other parameters;
        the lowest conflict value ($K_{min}^{(t)}$) is stored as well as the similarity indices ($i_1^{(t)}$ and $i_2^{(t)}$) of the two parameters grouped together;
    the identification of the radar mode consisting in choosing the grouping of parameters that arises from the iteration (t) whose value of lowest conflict ($K_{min}^{(t)}$) is less than a given threshold, and in retaining first the candidate mode whose similarity index is the largest from among the similarity indices stored up to the said iteration (t).

2. The method according to claim 1, wherein the method uses a database storing the radar modes in the forms of intervals delimited by the minimum and maximum values of each characteristic parameter, a candidate mode being selected in the said first step by comparing the measurements of parameters of the said unknown radar mode with the said intervals, a candidate mode being retained if it comprises at least one interval containing a measurement of a parameter of the unknown radar mode.

3. The method according to claim 2, wherein the parameters used to define the said intervals in the database are the emission frequency, the pulse length and the repetition period of the pulses.

4. The method according to claim 1, wherein the similarity indices being of the probabilistic type, the value of the conflict K between two parameters is given by the following equation:

$$K = 1 - \sum_B P_1(B) P_2(B)$$

$P_1(B)$, $P_2(B)$ being respectively the probability of one of the two parameters and the probability of the other parameter, in the mode B running through the set of candidate modes.

5. The method according to claim 1, wherein the similarity indices being of the possibilistic type, the value of the conflict K between two parameters is given by the following equation:

$$K = 1 - \sup_B \min(\pi_1(B), \pi_2(B))$$

$\pi_1(B)$, $\pi_2(B)$ being respectively the possibility of one of the two parameters and the possibility of the other parameter, in the mode B running through the set of candidate modes.

6. The method according to claim 1, wherein the similarity indices being of the credibilistic type, the value of the conflict K between two parameters is given by the following equation:

$$K = 1 - \sum_{B \cap C = \emptyset} m_1(B) m_2(C)$$

$m_1(B)$, $m_2(C)$ being respectively the credibility of one of the two parameters and the credibility of the other parameter, in the modes B and C running through the set of candidate modes.

7. The method according to claim 1, wherein the similarity index assigned to a parameter, for a candidate mode, is computed on the basis of a Jaccard index, this index being defined between the set of values of the said parameter for the said unknown radar mode and the set of values of the said parameter for the said candidate mode.

8. A device for identifying radar emission modes, wherein the device comprises a system for receiving radar signals and processing means able to implement the method according to claim 1.

9. A radar, wherein the radar is able to implement the method according to claim 1.

* * * * *